(12) United States Patent
Mikawa

(10) Patent No.: US 8,356,034 B2
(45) Date of Patent: Jan. 15, 2013

(54) IMAGE MANAGEMENT APPARATUS, CONTROL METHOD THEREOF AND STORAGE MEDIUM STORING PROGRAM

(75) Inventor: Chiaki Mikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 12/727,917

(22) Filed: Mar. 19, 2010

(65) Prior Publication Data

US 2010/0262605 A1 Oct. 14, 2010

(30) Foreign Application Priority Data

Apr. 9, 2009 (JP) ................................. 2009-095310

(51) Int. Cl.
*G06F 17/30* (2006.01)
(52) U.S. Cl. ...................................................... 707/740
(58) Field of Classification Search ........... 707/999.005, 707/204
See application file for complete search history.

(56) References Cited

U.S. PATENT DOCUMENTS 6,948,124 B2 * 9/2005 Combs et al. ................. 715/712
2007/0019001 A1 * 1/2007 Ha ................................. 345/619
2007/0120986 A1 5/2007 Nunomaki
2008/0260346 A1 * 10/2008 Sukeda et al. .................. 386/46
2009/0103630 A1 * 4/2009 Fuchikami et al. ...... 375/240.25
2010/0234841 A1 * 9/2010 Butts et al. ....................... 606/41

FOREIGN PATENT DOCUMENTS

JP 2007-134770 5/2007

* cited by examiner

*Primary Examiner* — Yuk Ting Choi
(74) *Attorney, Agent, or Firm* — Cowan, Liebowitz & Latman, P.C.

(57) ABSTRACT

The attribution information of a plurality of pieces of image data photographed by a plurality of photographing apparatus is obtained. The image data is classified into a predetermined time period on the basis of a photographing date and time obtained from the attribution information. The number of the photographing apparatus photographing the image data classified every predetermined time period is discriminated, and the image data classified into the time period in which the number of the pieces of image data is larger than a threshold value is extracted. The extracted image data is discriminated from the other image data to be displayed. Thereby, even if a plurality of pieces of still image data and moving image data photographed by a plurality of digital cameras and video cameras exists, a candidate of the image data relatively significant among them can be extracted easily.

11 Claims, 15 Drawing Sheets

FIG. 8

| FOLDER NAME | FILE NAME | PHOTOGRAPHING DATE AND TIME | IDENTIFIER | TYPE INFORMATION | OWNER'S NAME | PHOTOGRAPHING PLACE | | KEYWORD | CLASS |
|---|---|---|---|---|---|---|---|---|---|
| PHOTOGRAPH TAKEN BY MYSELF | IMG_0001 | 2008/04/20 9:04:30 | 111111 | Mode11 | I | LAT. 35° 40' | LAT. 139° 46' | WEDDING OF A | −1 |
| PHOTOGRAPH TAKEN BY MYSELF | IMG_0002 | 2008/04/20 9:12:20 | 111111 | Mode11 | I | LAT. 35° 40' | LAT. 139° 46' | WEDDING OF A | −1 |
| PHOTOGRAPH TAKEN BY MYSELF | IMG_0003 | 2008/04/20 9:14:10 | 111111 | Mode11 | I | LAT. 35° 40' | LAT. 139° 46' | WEDDING OF A | −1 |
| PHOTOGRAPH TAKEN BY MYSELF | IMG_0004 | 2008/04/20 9:37:00 | 111111 | Mode11 | I | LAT. 35° 40' | LAT. 139° 46' | WEDDING OF A | −1 |
| PHOTOGRAPH TAKEN BY MYSELF | IMG_0005 | 2008/04/20 9:37:55 | 111111 | Mode11 | I | LAT. 35° 40' | LAT. 139° 46' | WEDDING OF A | −1 |
| PHOTOGRAPH TAKEN BY MYSELF | IMG_0006 | 2008/04/20 9:44:05 | 111111 | Mode11 | I | LAT. 35° 40' | LAT. 139° 46' | WEDDING OF A | −1 |
| PHOTOGRAPH TAKEN BY MYSELF | IMG_0007 | 2008/04/20 9:44:25 | 111111 | Mode11 | I | LAT. 35° 40' | LAT. 139° 46' | WEDDING OF A | −1 |
| PHOTOGRAPH TAKEN BY MYSELF | IMG_0008 | 2008/04/20 9:45:03 | 111111 | Mode11 | I | LAT. 35° 40' | LAT. 139° 46' | WEDDING OF A | −1 |
| PHOTOGRAPH TAKEN BY MYSELF | IMG_0009 | 2008/04/20 9:59:59 | 111111 | Mode11 | I | LAT. 35° 40' | LAT. 139° 46' | WEDDING OF A | −1 |
| PHOTOGRAPH OBTAINED FROM B | BBB_0001 | 2008/04/20 9:00:00 | 222222 | Mode12 | B | LAT. 35° 40' | LAT. 139° 46' | WEDDING OF A | −1 |
| PHOTOGRAPH OBTAINED FROM B | BBB_0002 | 2008/04/20 9:01:50 | 222222 | Mode12 | B | | | | |
| ... | ... | ... | | | | | | ... | ... |

| UNIT TIME DESIGNATION DIALOG |
|---|

TO EXTRACT DATA OF TIME PERIOD IN WHICH PHOTOGRAPHING IS CONCENTRATED, PLEASE DESIGNATE MINIMUM TIME PERIOD LENGTH OF DISICION OF PHOTOGRAPHING-CONCENTRATING TIME PERIOD.

EXAMPLE: 0 DAY 0 HOUR 5 MINUTES 0 SECOND FOR 5 MINUTES

[    ] DAY  [    ] HOUR  [    ] MINUTES  [    ] SECONDS

| OK | CANCEL |
|---|---|

FIG. 11

| | FOLDER NAME | FILE NAME | DATA | SCENE | PHOTOGRAPHING DATE AND TIME | START TIME | END TIME | IDENTIFIER | TYPE INFORMATION | OWNER'S NAME | PHOTOGRAPHING PLACE | | KEYWORD | CLASS |
|---|---|---|---|---|---|---|---|---|---|---|---|---|---|---|
| 1120 | PHOTOGRAPHING TAKEN BY MYSELF | IMG_0001 | I | 0 | 2008/04/20 9:04:30 | NULL | NULL | 111111 | Mode11 | H | LAT. 35° 40' | LAT. 139° 46' | WEDDING OF A | -1 |
| | ... | ... | ... | ... | ... | ... | ... | ... | ... | ... | ... | ... | ... | ... |
| | PHOTOGRAPHING OBTAINED FROM E | EE_0001 | M | 1 | 2008/04/20 9:08:50 | 2008/04/20 9:08:50 | 2008/04/20 9:17:10 | 5555 | Mode15 | E | LAT. 35° 40' | LAT. 139° 46' | WEDDING OF A | -1 |
| | PHOTOGRAPHING OBTAINED FROM E | EE_0002 | I | 1 | 2008/04/20 9:17:50 | NULL | NULL | 5555 | Mode15 | E | LAT. 35° 40' | LAT. 139° 46' | WEDDING OF A | -1 |
| | PHOTOGRAPHING OBTAINED FROM E | EE_0003 | M | 1 | 2008/04/20 9:26:05 | 2008/04/20 9:26:05 | 2008/04/20 9:28:10 | 5555 | Mode15 | E | LAT. 35° 40' | LAT. 139° 46' | WEDDING OF A | -1 |
| 1116 | PHOTOGRAPHING OBTAINED FROM E | EE_0004 | M | 1 | 2008/04/20 9:36:05 | 2008/04/20 9:36:05 | 2008/04/20 9:39:10 | 5555 | Mode15 | E | LAT. 35° 40' | LAT. 139° 46' | WEDDING OF A | -1 |
| 1117 | PHOTOGRAPHING OBTAINED FROM E | EE_0004 | M | 2 | 2008/04/20 9:36:05 | 2008/04/20 9:39:11 | 2008/04/20 9:45:05 | 5555 | Mode15 | E | LAT. 35° 40' | LAT. 139° 46' | WEDDING OF A | -1 |
| 1118 | PHOTOGRAPHING OBTAINED FROM E | EE_0004 | M | 3 | 2008/04/20 9:36:05 | 2008/04/20 9:45:06 | 2008/04/20 9:53:45 | 5555 | Mode15 | E | LAT. 35° 40' | LAT. 139° 46' | WEDDING OF A | -1 |
| 1119 | PHOTOGRAPHING OBTAINED FROM E | EE_0004 | M | 4 | 2008/04/20 9:36:05 | 2008/04/20 9:53:46 | 2008/04/20 9:58:00 | 5555 | Mode15 | E | LAT. 35° 40' | LAT. 139° 46' | WEDDING OF A | -1 |
| | ... | ... | ... | ... | ... | ... | ... | ... | ... | ... | ... | ... | ... | ... |

IMAGE MANAGEMENT APPARATUS, CONTROL METHOD THEREOF AND STORAGE MEDIUM STORING PROGRAM

BACKGROUND OF THE INVENTION

1. Field of the Invention

The present invention relates to an image management apparatus for managing an image, a control method thereof, and a storage medium storing a program.

2. Description of the Related Art

As communication techniques have developed, it has been generally performed to share an image photographed with a personal digital camera or a digital video camera in a group composed of a plurality of persons, give the image to another person, or obtain the image from another person. Moreover, as a storage medium has enlarged the capacity thereof, the storage medium has come to store a large quantity of images. In such a situation, it has been hard for a user to find a significant image among the large quantity of images.

SUMMARY OF THE INVENTION

It is an aspect of the invention to provide an image management apparatus for extracting a candidate of a significant image from the images photographed with a plurality of digital cameras or video cameras to enable a user to simply find a desired image.

A data management apparatus of the present invention includes an attribution information obtaining unit for obtaining the attribution information of image data, an image data classification unit for classifying the image data into a predetermined time period based on a photographing date and time included in the attribution information, a count unit for counting a number of photographing apparatus pertaining to the image data classified into the predetermined time period based on the attribution information, and an image data extracting unit for extracting the image data classified into the predetermined time period in accordance with the number counted by the count unit.

According to the present invention, a candidate of a significant image is extracted from a plurality of images photographed with a plurality of digital cameras or video cameras, and consequently a user simply find his or her desired image.

Further features of the present invention will become apparent from the following description of exemplary embodiments with reference to the attached drawings.

BRIEF DESCRIPTION OF THE DRAWINGS

FIG. 8 shows an example of a list of information necessary for the display of image data and the processing of the extraction thereof, which image data is held by the data management apparatus according to the first embodiment of the present invention.

FIG. 9 shows an example of a dialog for designating a unit time in the data management apparatus according to the first embodiment of the present invention.

FIG. 11 shows an example of a list of the information peculiar to a moving image and the like, which list is held by the data management apparatus according to the second embodiment of the present invention.

DESCRIPTION OF THE EMBODIMENTS

In the following, the exemplary embodiments of the present invention will be described in detail with reference to the attached drawings.

First Embodiment

A data management apparatus according to a first embodiment of the present invention manages the still image data and the moving image data that have been obtained by an electronic camera, such as a digital still camera and a digital video camera, which performs photographing by converting an optical image into electric image data with a solid state image pickup element. In the present embodiment, the case where the data management apparatus manages still image data as a subject of processing will be described.

Information Processing Apparatus Functioning as Data Management Apparatus

Figure 1:
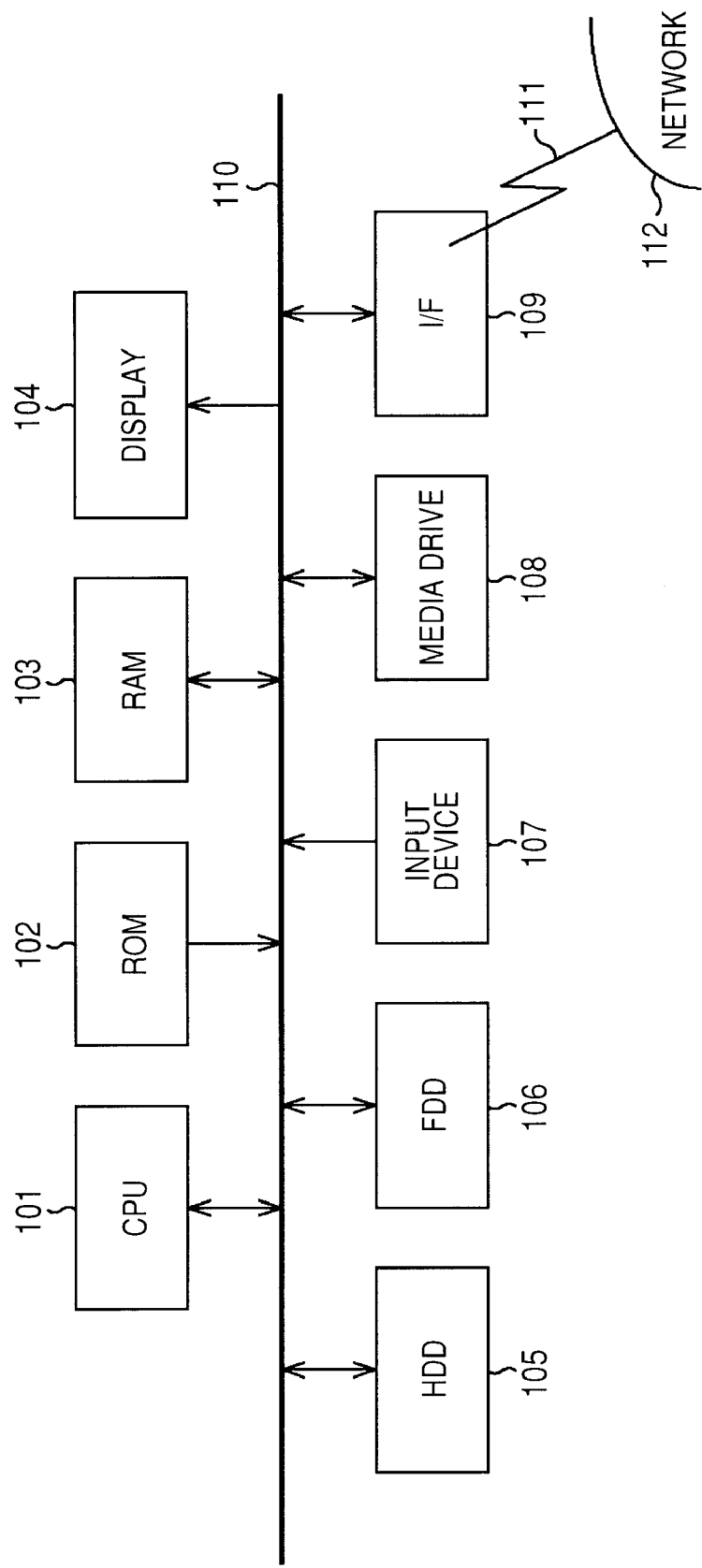
FIG. 1 is a block diagram illustrating the system configuration of an information processing apparatus functioning as a data management apparatus according to a first embodiment of the present invention.

First, an information processing apparatus functioning as the data management apparatus according to the present embodiment is described. FIG. 1 is a block diagram illustrating the system configuration of the information processing apparatus according to the present embodiment. The information processing apparatus realizes the data management processing to be described below by executing a predetermined control program, and thereby functions as the data management apparatus.

In FIG. 1, a central processing unit (CPU) 101 performs the control of the whole of the present apparatus. A read only memory (ROM) 102 stores an operation processing procedure (for example, programs of booting processing and basic input-output processing of a computer) of the CPU 101. A random access memory (RAM) 103 functions as the main memory of the CPU 101. Various programs including a control program for realizing the processing to be described below are loaded on the RAM 103 from a hard disk drive 105 and the like. The control program loaded on the RAM 103 is executed by the CPU 101. Moreover, the RAM 103 provides a work area at the time when the CPU 101 executes various kinds of processing.

A display 104 performs various displays under the control of the CPU 101. The hard disk drive (hereinafter referred to as HDD) 105 and a flexible disk drive (hereinafter referred to as FDD) 106 are used for the saving and the reading of an application program, data, a library and the like. Moreover, an optical (magnetic) disk drive, such as a compact disc read-only memory (CD-ROM), a magneto-optic disk drive (MO) and a digital versatile disk (DVD), a magnetic tape drive, such as a tape streamer and a digital data storage (DDS), and the like may be provided in place of the FDD 106 or in addition to the FDD 106.

An input device 107 is a keyboard, a pointing device, or the like. A storage medium attaching unit (media drive) 108 enables the installation of a storage medium pulled out of a digital still camera or a digital video camera to read out the data stored therein.

A network interface 109 is to be connected to a network 112 through a communication line 111. When the network interface 109 is connected to the network 112, data can be transmitted and received from a server computer and a recording medium. A system bus (including an address bus, a data bus and a control bus) 110 connects the respective units mentioned above to each other.

Still Image Data to be Subject of Processing

Figure 2:
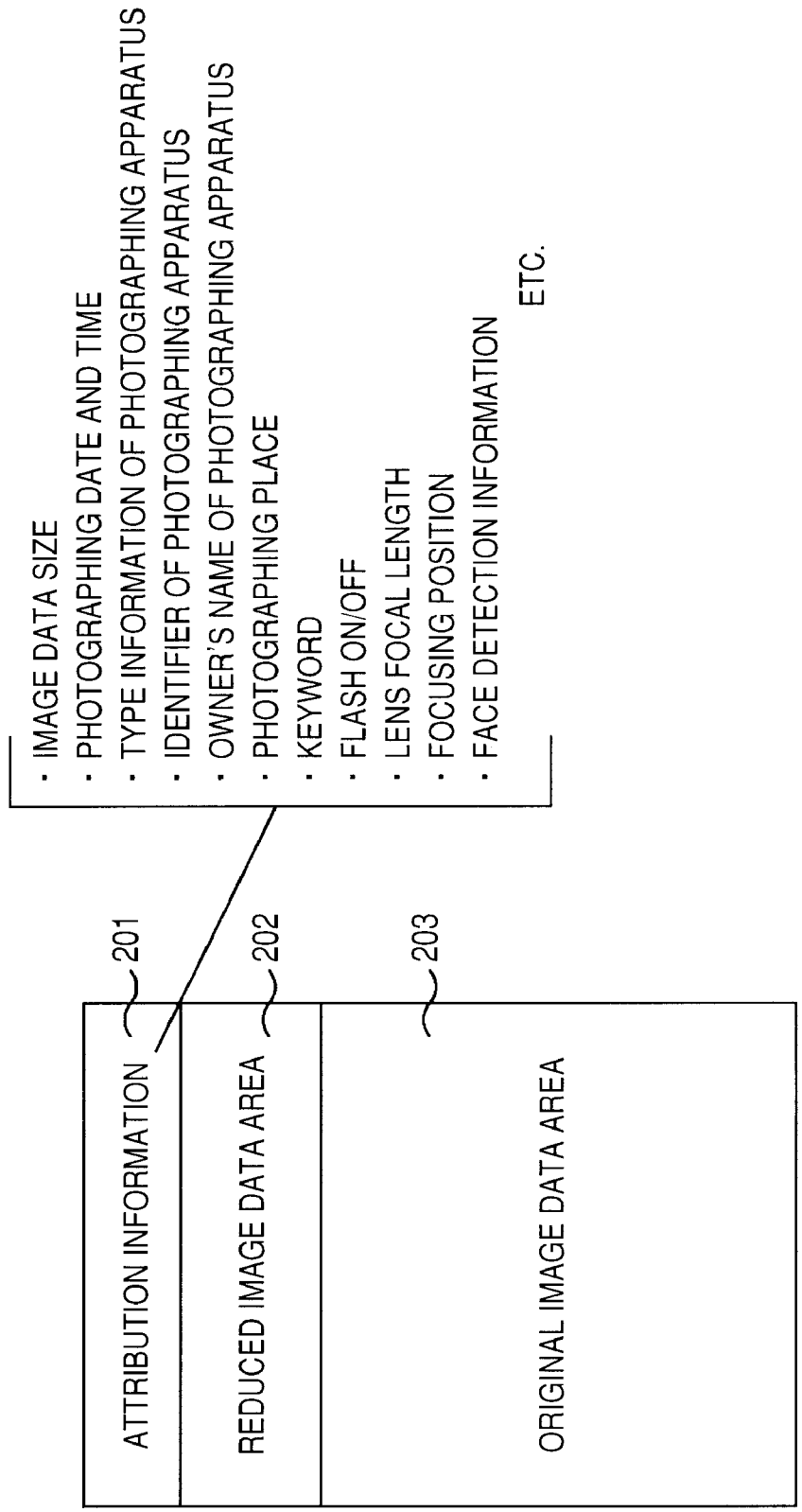
FIG. 2 is a schematic configuration diagram of a still image file which is a subject of processing of the data management apparatus according to the first embodiment of the present invention.

Next, the schematic configuration of a still image file containing still image data therein, which image data is a subject of processing of the data management apparatus according to the present embodiment will be described. FIG. 2 is a schematic configuration diagram of a still image file (hereinafter referred to be as image file).

In FIG. 2, an attribution information area 201 of still image data is an area for storing the information at the time of photographing, such as a photographing date and time, an identifier of a photographing apparatus, the type information of the photographing apparatus, the owner's name of the photographing apparatus, a photographing place, a keyword set by a photographer and face detection information, and the information necessary for reading out and the reproduction of an image. Also a photographing-concentrating time period decision flag to be described later is stored in the attribution information area 201. The photographing-concentrating time period decision flag is a flag to be added to an image photographed in a photographing-concentrating time period, which is a time period in which a plurality of images are photographed by a plurality of photographing apparatus in a concentrated manner, if it is simply described. The data management apparatus according to the present embodiment is adapted to extract an image to be considered to be significant by adding such a flag to a specific image and discriminating the image from the other images, though the details of the flag will be described later.

Incidentally, in the present embodiment, subsequent descriptions will be provided on the supposition that an image file to be a subject of processing is a Joint Photographic Experts Group (JPEG) file of the Design Rule for Camera File System (DCF) standard. In this case, the information having a tag to be stored in advance based on the DCF standard is stored in conformity with the DCF standard, and the information having no suitable tag to be stored is stored by the use of the area of makernote (i.e. manufactures specific field). In this case, the photographing-concentrating time period decision flag is supposed to be stored in the makernote to be four bit. When a photographing apparatus generates a JPEG file, the four bits to be used for the photographing-concentrating time period decision flag are supposed to be "0000." Alternatively, the data of the photographing-concentrating time period decision flag is supposed not to be written in.

A reduced image data area 202 is an area in which reduced image data to be displayed at the time of the display as a list is stored. An image data area 203 is an area in which all image data to be stored as the image file is stored.

Data Management Apparatus User Interface

Next, a user interface of the data management apparatus according to the present embodiment will be described with reference to FIGS. 3 and 4. This user interface is displayed on the display 104 of the information processing apparatus mentioned above.

Figure 3:
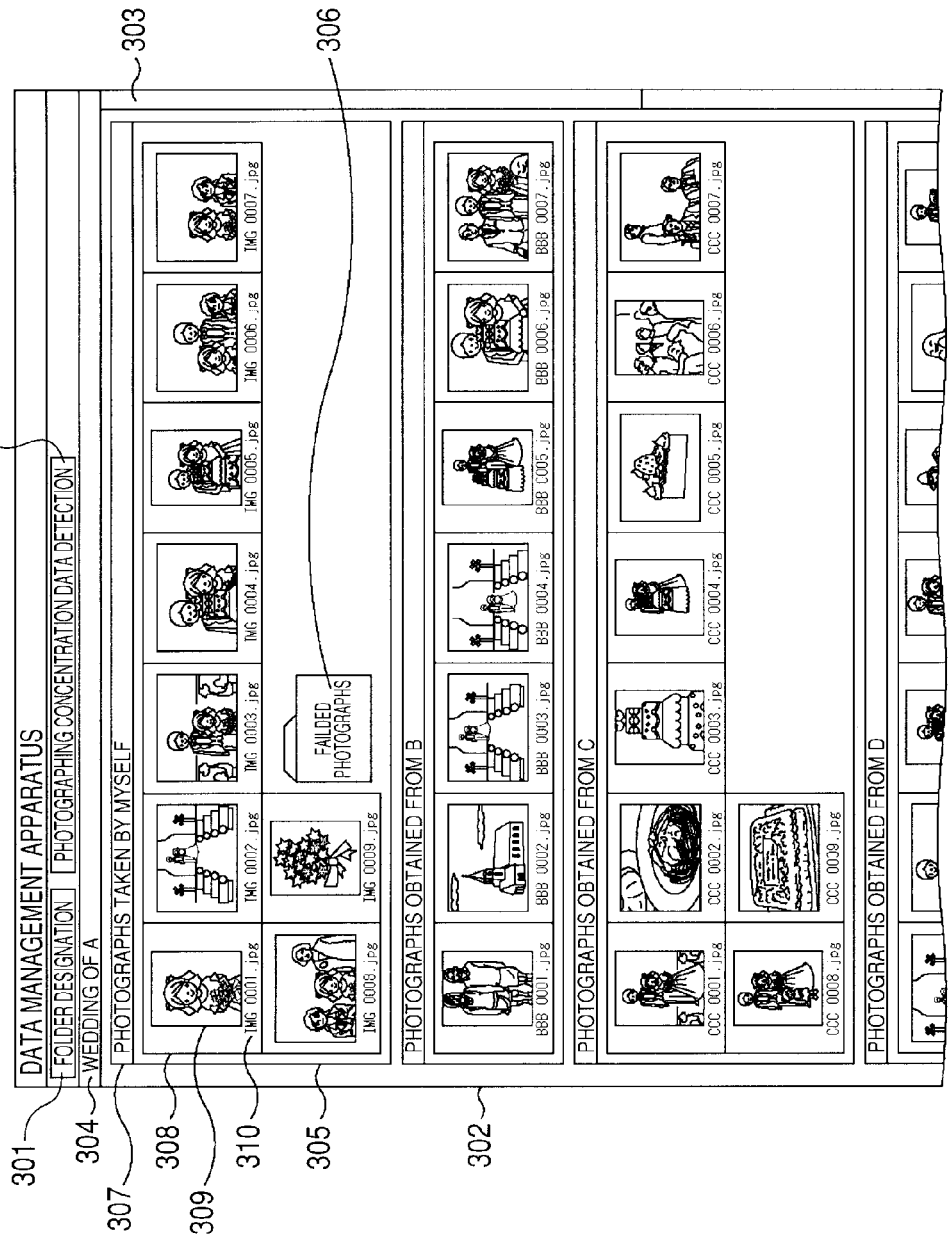
FIG. 3 shows an example of a user interface of the data management apparatus according to the first embodiment of the present invention.

First, FIG. 3 shows an example of a user interface of the data management apparatus according to the present embodiment. In FIG. 3, four sub folders of "Photographs Taken by Myself," "Photographs Obtained from B," "Photographs Obtained from C" and "Photographs Obtained from D" are contained in a folder of "Wedding of A," which a user has designated. Then, image files are contained in these sub folders. In the following, each part of the user interface will be described.

A folder designation button 301 is a button for designating a folder containing the image files to be displayed as a list of images. By depressing this button, a folder designation dialog is opened, and a unit for the user's designation of a folder is supplied.

Figure 4:
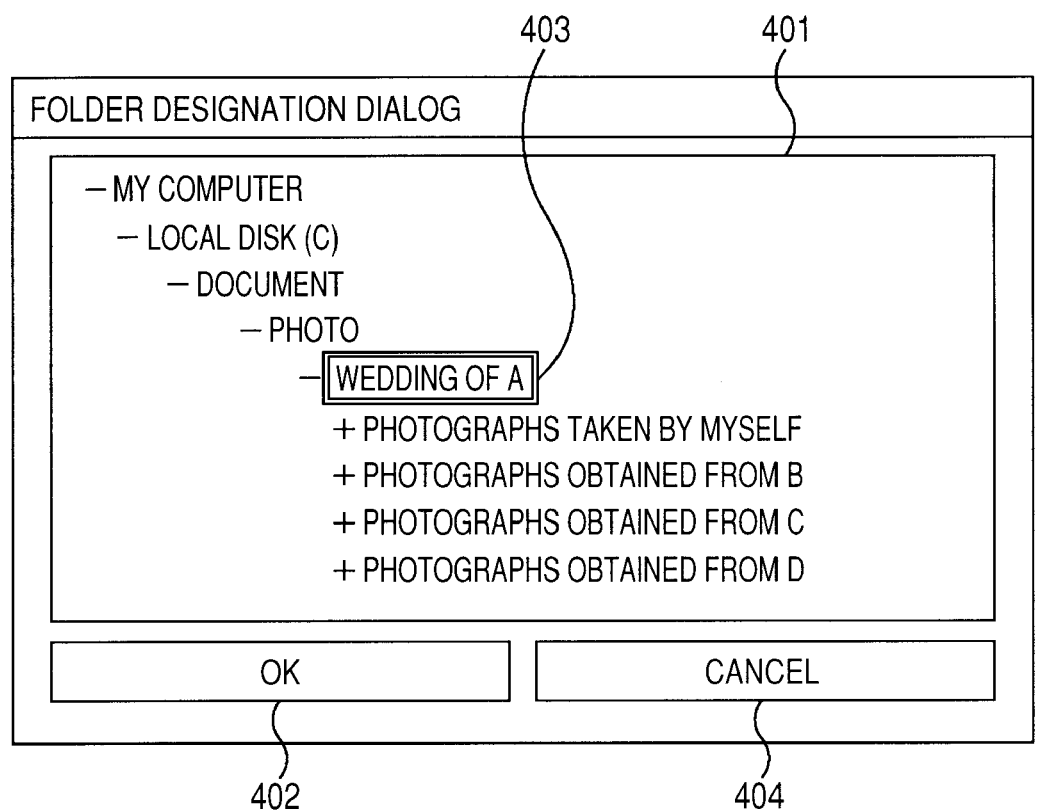
FIG. 4 shows an example of a folder designation dialog in the user interface of the data management apparatus according to the first embodiment of the present invention.

Here, an example of the folder designation dialog is illustrated in FIG. 4. In FIG. 4, a tree view 401 is the one for displaying the folders of readable image files as a list. By clicking a position where a folder name is displayed in the tree view 401 with a pointing device, the folder can be selected. Otherwise, the selection may be performed by depressing an arrow key or a Tab key in a keyboard.

An OK button 402 enables a user to designate a desired folder by depressing the OK button 402 after selecting the folder in the tree view 401. A selection frame 403 shows the position clicked with the pointing device. The example of FIG. 4 shows that the "Wedding of A" folder is being selected.

A cancel button 404 is a button for cancelling a designation of a folder. When a user depresses the cancel button 404 to close the folder designation diagram in the state in which a folder has been selected in the selection frame 403 with the pointing device, the folder designation dialog is configured not to change the folder.

Returning to FIG. 3, an area 302 is the area for displaying images as a list. In the area 302, the reduced image data of displayable image files in the sub folder in a layer lower than the layer of the designated folder is displayed as a list. A scroll bar 303 enables a display to be switched in the vertical direction when reduced image data cannot fully be displayed in the area 302.

A parent folder name display bar 304 displays the folder name of a designated folder, and is arranged on the upside of the area 302.

A sub folder frame 305 illustrates a folder in a layer lower than a designated folder. If there are sub folders in the layer lower than the designated folder, the same number of the sub folder frames 305 as that of the sub folders are displayed, and the image files contained in each of the sub folders are displayed in the corresponding sub folder frame 305 as a list. The present embodiment is configured so that the sub folders in the lower layer up to one step may be displayed and the sub folders in the layer lower than two steps may be illustrated by a folder mark 306.

A sub folder name display bar 307 displays the name of a sub folder and is arranged on the upside of the sub folder frame 305.

A thumbnail frame 308 is composed of thumbnail display areas 309 and file names 310, and one thumbnail frame 308 is displayed per image file. The thumbnail display areas 309 and the file name display 310 are contained in the thumbnail frame 308. The reduced image data in the reduced image data area 202 (FIG. 2) is displayed in the thumbnail display areas 309, and the names of still image data are displayed in the file name display 310. By depressing a photographing concentration data detection button 311, the data extraction processing in a photographing-concentrating time period to be described with reference to FIG. 5 is performed.

Data Extraction Processing in Photographing-Concentrating Time Period

Figure 5:
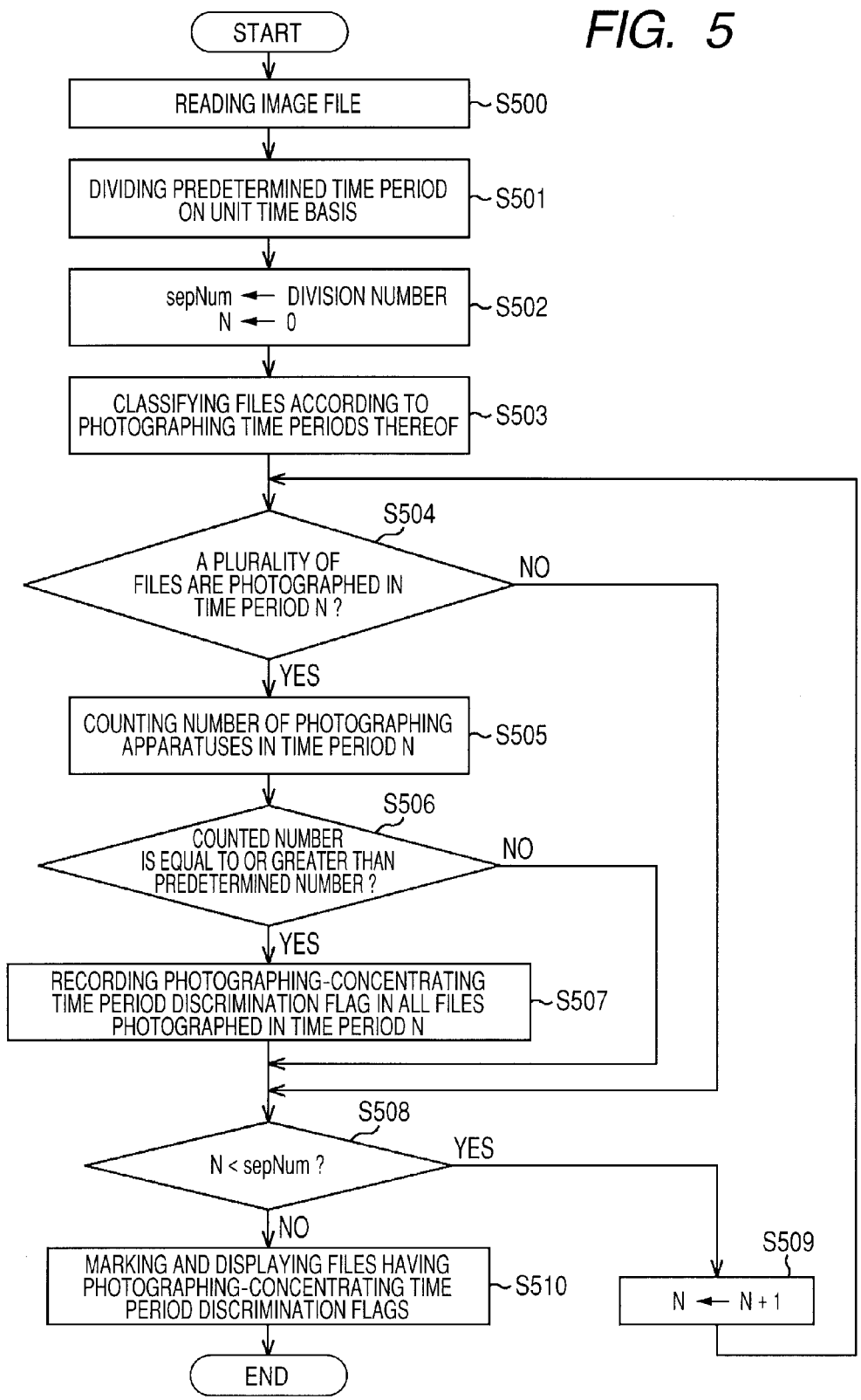
FIG. 5 is a flow chart illustrating the flow of the data extraction processing in a photographing-concentrating time period in the data management apparatus according to the first embodiment of the present invention.

FIG. 5 is a flow chart illustrating the flow of the data extraction processing in a photographing-concentrating time period in the data management apparatus according to the present embodiment. Incidentally, the present processing is executed by the execution of a control program stored in the RAM 103 by the CPU 101. In the following, the method of discriminating a photographing-concentrating time period from an image file to be a subject of processing to extract still image data photographed in the photographing-concentrating time period will be described with reference to FIG. 5 in addition to FIGS. 2 and 3.

First, at Step S500, the CPU 101 reads the image files in the folder designated by a user with the folder designation button 301 from the HDD 105, the FDD 106, or the media drive 108 into the RAM 103. Then, the reduced image data of the reduced image data area 202 of each image file is displayed in the area 302 for image list display. At this time, the CPU 101 holds the information necessary for the display and the extraction processing of the still image data in the image files in the RAM 103 as a list in relation to the image files.

Here, an example of the information necessary for the display and the extraction processing of the still image data held by the CPU 101 is illustrated in FIG. 8.

In FIG. 8, a folder name 801 holds the names of folders containing image files. If an image file exists directly under the drives of the HDD 105, the FDD 106, or the media drive 108, the folder name 801 hold the drive name.

A file name 802 denotes the names of image files. A photographing date and time 803 denotes photographing dates and times. An identifier 804 denotes identifiers for identifying photographing apparatus uniquely. Type information 805 denotes the type information of photographing apparatus. An owner's name 806 denotes the owner's names of photographing apparatus. A photographing place 807 denotes photographing places. A keyword 808 denotes keywords set (input) by a photographer arbitrarily and is obtained from the attribution information area 201. Incidentally, if the data management apparatus failed to obtain these pieces of information, or if there is no corresponding information, then the data management application displays "NULL" to these cases. Moreover, a class 809 is classification information (class) for classifying the time periods in which the still image data in the image files to be the subjects of processing is severally photographed. The details of the class 809 will be described at Step S503, described below. Incidentally, the classes of all image files are made to be −1 at the time point of Step S500. Incidentally, the processing of the data management apparatus to obtain these pieces of attribution information is the processing corresponding to one step of processing by the attribution information obtaining unit of the present invention.

Returning to FIG. 5, the CPU 101 next divides a predetermined time period on a unit time basis at Step S501. The predetermined time period is a period from the photographing date and time of the oldest image file to the photographing date and time of the newest image file among the image files to be the subjects of processing, and the unit time is a time for dividing the predetermined time period.

For example, if the photographing date and time of the oldest image file is at 9:00 on Apr. 20, 2008 and the photographing date and time of the newest image file is at 9:59 on Apr. 20, 2008, then the predetermined time period in this case is from 9:00 on Apr. 20, 2008 to 9:59 on Apr. 20, 2008. Incidentally, the predetermined time period may be configured to be arbitrarily set by a user.

Moreover, the unit time may be designated by a user, or a default value may be used as the unit time. In the present embodiment, a default value is used, and is supposed to be set for five minutes. However, the default value is inevitably made to be a value smaller than the predetermined time period. The details of the determination method of the unit time will be described later.

For example, if the predetermined time period and the unit time are the following conditions, then the predetermined time period is divided into 9:00:00 to 9:04:59 on Apr. 20, 2008, 9:05:00 to 9:09:59 on the same date, . . . , 9:55:00 to 9:59:00 on the same date at Step S501.

Conditions

Unit Time is 5 (minutes).

Start Date and Time of Predetermined Time Period is 9:00 on Apr. 20, 2008.

End Date and Time of Predetermined Time Period is 9:59 on Apr. 20, 2008. Next, at Step S502, the CPU 101 assigns zero to a counter N and assigns a division number to sepNum. The counter N and the sepNum are used for discriminating whether all the time periods divided on the unit time basis are severally the photographing-concentrating time period or not. The calculation method of the division number sepNum is shown in the next formula 1.

$$sepNum = (endTime - startTime)/sepTime \qquad (1)$$

Here, sepTime denotes a unit time, startTime denotes the start date and time of a predetermined time period, and endTime denotes the end date and time of the predetermined time period.

Moreover, the counter N is the one to be assigned the identification number of a divided time period. In the present embodiment, the first time period is assigned "0," and the last time period is assigned "sepNum−1."

Next, at Step S503, the CPU 101 classifies the still image data to be the subjects of processing according to their photographing time periods on the basis of the information of the photographing dates and times obtained from the attribution information area 201, and records the numbers X of the time periods into the class 809. Supposing each time period as time period 0 to time period (sepNum−1), the calculation method of a time period X in which an image file of a subject of processing is contained is expressed by the following formula 2.

$$X = ((capTime - startTime) \div sepTime) \quad (2)$$

Here, sepTime denotes a unit time; startTime denotes a start date and time of a predetermined time period; and capTime denotes a photographing date and time of still image data of a subject of processing.

For example, the calculation method of the time period X by the formula 2 under the following conditions becomes as follows. Incidentally, because the start time of the predetermined time period is the same day, the calculations pertaining to days are omitted.

Conditions

Unit Time: 5 (minutes)

Start Date and Time of Predetermined Time Period: 9:00 on Apr. 20, 2008

End Date and Time of Predetermined Time Period: 9:59 on Apr. 20, 2008

Photographing Date and Time of Still Image Data of Subject of Processing: 9:21:32 on Apr. 20, 2008

Calculation Method by Formula 2

1. Calculation of $capTime - startTime$ $[9:21:32] - [9:00:00] = 00:21:32$

2. Calculation of $\left[ \dfrac{(capTime - startTime)}{sepTime} \right]$ $X = [0:21:32 / 0:05:00]$
   $= \left[ \dfrac{(60 \times 21 + 32)}{(60 \times 5)} \right]$
   $= [4.306666 \ldots ]$
   $= 4$ Next, at Step S504, the CPU 101 discriminates whether the number of the pieces of still image data photographed in the time period N assigned to the counter N is plural or not. Here if the number is a plural one, the CPU 101 advances the processing to Step S505. If the number is not a plural one, the CPU 101 advances the processing to Step S509 through Step S508.

At Step S505, the CPU 101 counts the number of the photographing apparatus in the time period N. The number of the photographing apparatus is counted by the number of different identifiers. The handling of the case where the identifier 804 is null by the photographing apparatus will be described later.

Next, at Step S506, the CPU 101 discriminates whether the number of the photographing apparatus counted at Step S505 is equal to or greater than a predetermined number or not. In the present embodiment, the predetermined number is set as four, which is the number of all the photographing apparatus. Incidentally, the predetermined number may arbitrarily be designated by a user, or may be determined on the basis of a rate of the number of the photographing apparatus, such as a half of all of the apparatus. If the predetermined number is determined by the rate of the number of all of the photographing apparatus, it is necessary to count in advance the number of all of the photographing apparatus on the basis of the image files of the subjects of processing beforehand. In that case, at Step S500, the identifiers of the photographing apparatus are obtained to count the number of the apparatus together with the production of a list at the time of reading all of the image files. Alternatively, if a user recognizes the number of all the apparatus, the data management apparatus may be configured to allow a user to input the number. At this time, when the user designates an unsuitable value such as zero, the data management apparatus displays a warning, and then performs processing on the basis of the default value. The default value of the predetermined number is set to be two.

Then, at Step S506, if the number of the photographing apparatus in the time period N is less than the predetermined number, then the data management apparatus advances the processing to that at Step S508. If the number is the predetermined number or more, the data management apparatus advances the processing to that at Step S507.

At Step S507, the CPU 101 sets the time period N to a photographing-concentrating time period, and extracts all image files photographed in the time period N. Then, the CPU 101 changes the four bits of the photographing-concentrating time period decision flag of the attribution information area 201 to "0001," and records the changed bits. That is, if there is a plurality of images photographed at a certain time period and the images have been photographed by many photographing apparatus, then the images photographed in this time period are considered to be recognized by all as significant scenes, and the images are treated to be discriminated from the other images. Moreover, if the attribution information area 201 is not rewritten, then other data is held in the RAM 103 or the HDD 105 as attribution information, and is made to be related to image files.

Next, at Step S508, the CPU 101 discriminates whether the counter N is less than the division number sepNum or not. If the counter N is less than the division number sepNum, the CPU 101 considers that the processing has not ended in all time periods, and advances the processing to that at Step S509 to increment the counter N. Then, the CPU 101 advances the processing to Step S504, and repeats the processing from Step S504 to Step S508.

Moreover, if the counter N is the division number sepNum or more at Step S508, then the CPU 101 advances the processing to Step S510. At Step S510, the CPU 101 displays the image files having four bits of "0001" of the photographing-concentrating time period decision flag in the attribution information area 201 with photographing-concentrating time period marks, and then the CPU 101 ends the data extraction processing.

Figure 6:
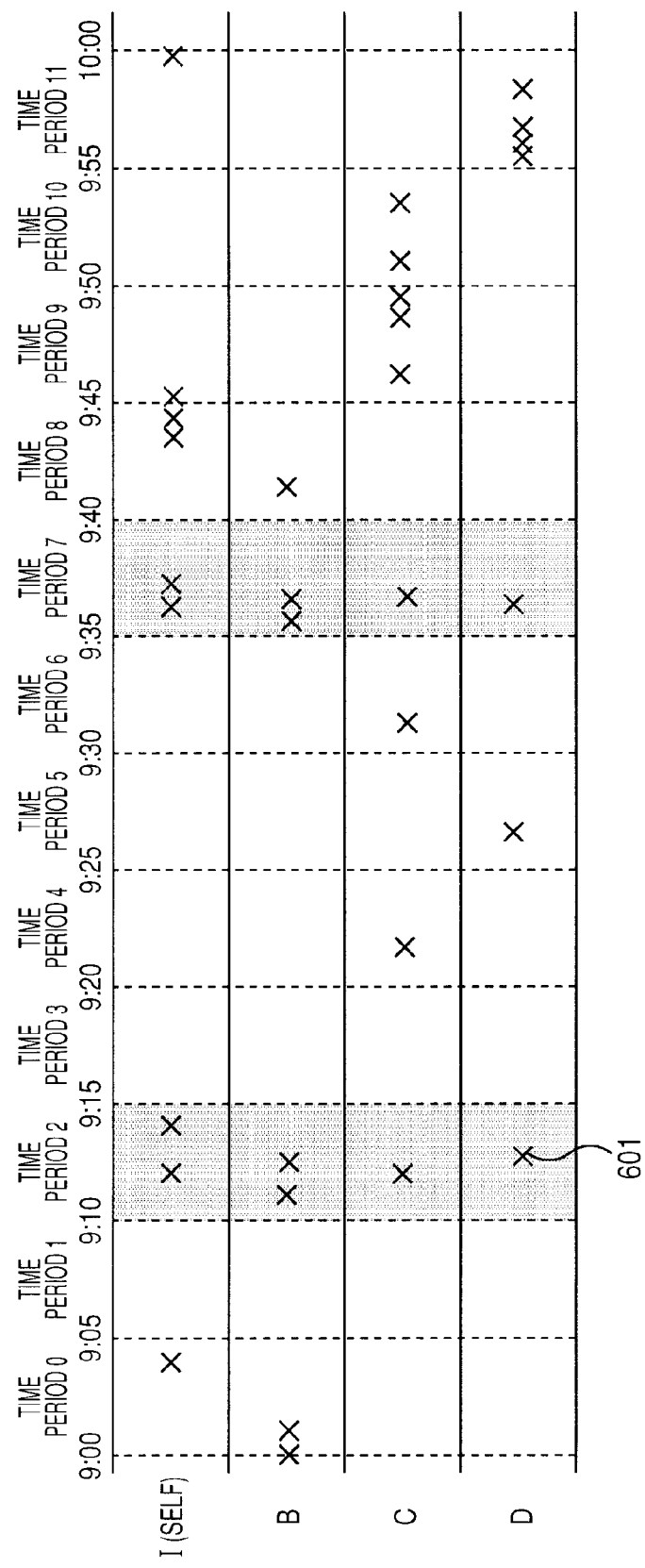
FIG. 6 is a conceptual diagram illustrating an example of the relation between a distribution of photographing times of images and photographing-concentrating time periods in the first embodiment of the present invention.

FIG. 6 is a conceptual diagram illustrating an example of the relation between a distribution of the photographing dates and times of the image data and photographing-concentrating time periods in the present embodiment. In FIG. 6, the abscissa axis indicates times, and x marks denote photographing dates and times when still image data is photographed. The characters in the ordinate axis (self, B, C and D) are the names of the owners of the photographing apparatus. For example, x mark 601 indicates that the person D photographed still image data at 9:13:00. In this example, each of a time period 2 and a time period 7, in which photographing by four photographing apparatus concentrates, are set as photographing-concentrating time periods (hatched time periods in FIG. 6) by the data extraction processing described with reference to FIG. 5, and all of the photographed still image data is extracted to be given flags.

Figure 7:
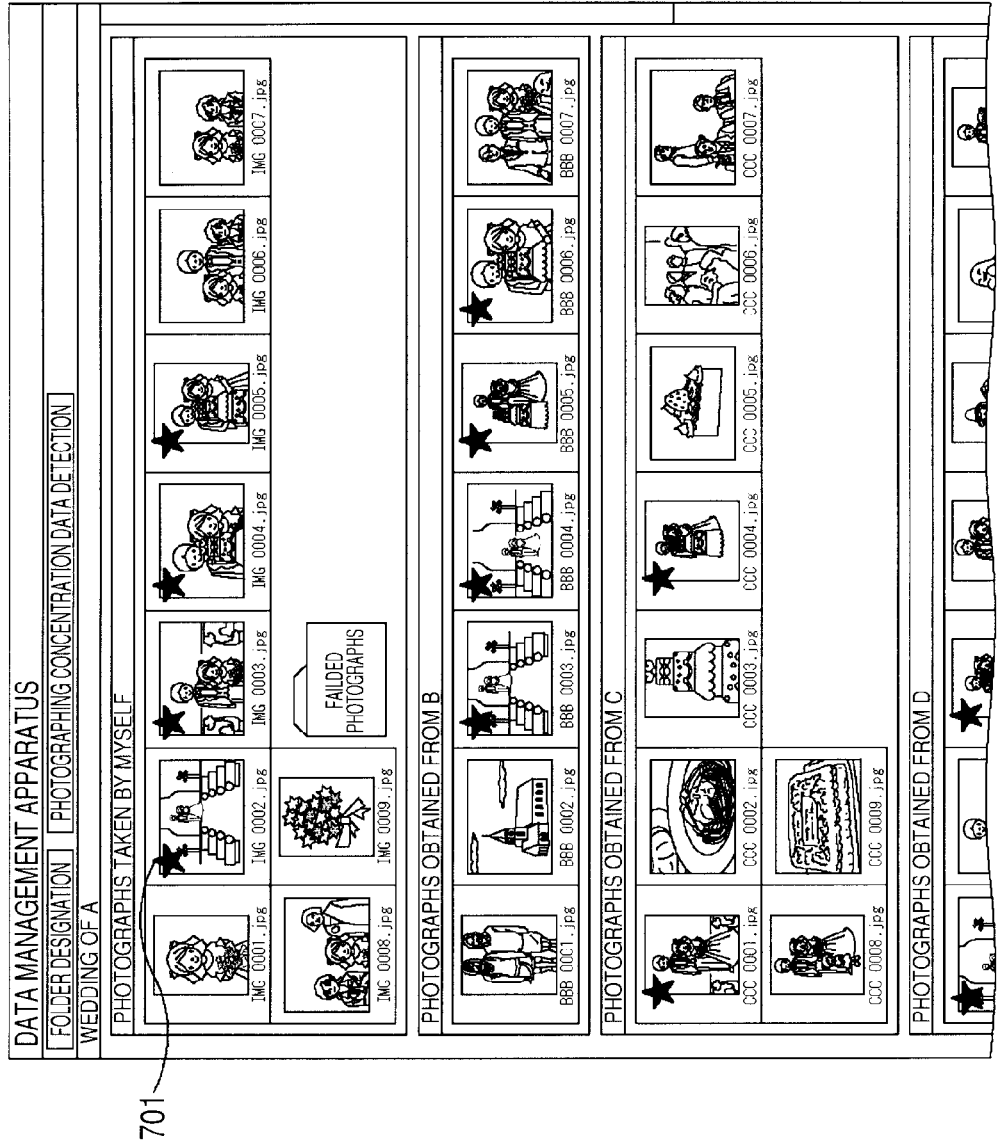
FIG. 7 shows an example of a user interface in which the data management apparatus according to the first embodiment of the present invention displays a result of data extraction processing.

FIG. 7 shows an example of a user interface displayed in a reflection of the results of the data extraction processing described with reference to FIG. 5.

In FIG. 7, a mark 701 is attached to the reduced image data of the still image data supplied with photographing-concentrating time period decision flag at Step S507. The user interface is adapted to add the photographing-concentrating time period marks to the still image data photographed by many members in a group in the same time periods on the basis of the recognition of the members as being significant scenes by the processing described with reference to FIG. 5. This example shows the state of affairs in which all the members simultaneously photographed the scenes of the entrance of the bride and the bridegroom and the wedding cake cutting among the pieces of still image data photographed by the group of the gusts at the wedding of the person A illustrated in FIG. 3 and the pieces of still image data photographed there were extracted.

Photographing Apparatus Discrimination Information Obtaining Method

Next, at Step S505, the handling of the case where the identifier 804 of a photographing apparatus is null will be described.

In the case where the identifier 804 of the photographing apparatus is null, the information is used in the order of the owner's name 806 of the photographing apparatus, the type information 805 of the photographing apparatus, and the folder name 801. If the owner's name 806 of the photographing apparatus is not null, the owner's name is substituted for the photographing apparatus discrimination information at Step S505. If the owner's name 806 of the photographing apparatus is null, the type information 805 of the photographing apparatus is substituted for the photographing apparatus discrimination information. If the type information of the photographing apparatus is null, the folder name 801 containing the image file therein is substituted for the photographing apparatus discrimination information. If the image file branches directly from a drive, as described at Step S500, the drive name is held in the folder name 801, and the drive name is substituted for the photographing apparatus discrimination information similarly to the folder name.

By the method described above, even if the data management apparatus according to the present embodiment failed to obtain the information of the identifier of the photographing apparatus, the data management apparatus can perform the data extraction processing of significant image data.

Unit Time Determination Method

Next, a unit time determination method will be described. Although the case where the unit time is the default value has been described in the above, other determination methods of the unit time will be described in the following.

If a photographing-concentrating time period becomes equal to or more than a predetermined number to the number of all the time periods, the unit time is changed to be shorter. For example, if the unit time is five minutes and the photographing-concentrating time period becomes a half or more of the division number of all of the time periods, the unit time is changed to two minutes and 30 seconds, a half of five minutes. By shortening the unit time and repeating the processing recursively in this way, the accuracy of the discrimination of the photographing-concentrating time periods becomes higher and the number of the photographing-concentrating time periods becomes less. On the other hand, if none of the photographing-concentrating time periods exist, the unit time is changed to be longer. For example, if the unit time is five minutes and none of the photographing-concentrating time periods exist, then the unit time is changed to be ten minutes, the double of five minutes. Incidentally, the discrimination whether such change processing of the unit time is necessary or not may be performed between the processing at Steps S508 and S510. Then, the unit time may be changed as the occasion demands to return the processing to Step S501.

Moreover, at Step S503, if the number of data in each time period becomes one or zero after the classification of the whole image data in the image file of a subject of processing, the unit time is changed to be longer, and classification processing is again performed. At this time, the length of the unit time is made to be longer than at least the difference between the times of two pieces of still image data whose photographing dates and times are nearest to each other. Incidentally, the discrimination whether such change processing of the unit time is necessary or not may be performed after the processing at Step S503. Then, the unit time is changed as the occasion demands and the processing is returned to that at Step S501 to perform the processing recursively. However, the unit time is made to be shorter than the difference between a start time and an end time of the predetermined time period no matter how the unit time may be long.

Moreover, a user may input a dialog for determining the unit time after the processing at Step S500, and the unit time may be determined in accordance with the input. An example of a dialog of determining the unit time is illustrated in FIG. 9. If a user designates a time longer than the predetermined time period or zero second in the dialog illustrated in FIG. 9, a warning of "Please designate a time of value larger than 0 and smaller than T," may be displayed to urge the user to designate the unit time again. Incidentally, the T is a time of the difference between the start time and the end time of the predetermined time period.

By changing the unit time using the plurality of methods described above, the accuracy of extracting the photographing-concentrating time periods can be changed in the data management apparatus according to the present embodiment.

Handling Method According to Existence of Image File

Moreover, although the present embodiment sets the still image data of the image files contained in a folder designated in the folder designation dialog as a subject of processing, an image file may be read individually in a general file opening dialog, and the read image file may be set as the subject of processing.

Moreover, although the image files stored in the HDD 105, the FDD 106 or the media drive 108 are exemplified in the present embodiment, the still image data received from a recording medium or a server computer existing in the network 112 may be set as the subject of processing. In this case, the folder name 801 is selected as a folder in which the received data is saved. Otherwise, the still image data may be generated from the discrimination information of a server computer or a Uniform Resource Locator (URL), which is the information indicating the position of data on the Network. If there is the discrimination information of the album data related to the data received by the server computer, the discrimination information of the album data may be used.

The first embodiment of the present invention has been described above. If a plurality of pieces of still image data photographed in a specific time period exists and these pieces of still image data are photographed by a plurality of photographing apparatus, then the data management apparatus according to the present is adapted to extract those pieces of still image data by determining them to be significant image data. This configuration enables a user to easily extract a candidate of significant image data out of a plurality of pieces of image data without being required to manually set significance to image data.

Moreover, although the data management apparatus according to the present embodiment examines the number of the photographing apparatus by obtaining the identifiers of the photographing apparatus, the data management apparatus can examine the number of the photographing apparatus by using the information such as owner's names even if the data management apparatus failed to obtain the information of the identifiers of the photographing apparatus. Thereby, even if the data management apparatus failed to obtain the information of the identifiers of the photographing apparatus or there is no information of the identifiers, the data management apparatus can perform the extraction processing of significant image data.

Moreover, the data management apparatus according to the present embodiment can change the unit time according to the frequency of the photographing-concentrating time period and the designation of a user. Hereby, the accuracy of the extraction of the photographing-concentrating time period can be changed.

Furthermore, the data management apparatus according to the present embodiment can extract a candidate of significant image data for a group as a subject of processing even if image data is that received from a recording medium or a server computer existing on a network.

Second Embodiment

Next, a data management apparatus according to a second embodiment of the present invention will be described. In the present embodiment, the case where the data management apparatus also deals with moving image data in addition to still image data as a subject of processing will be described. Incidentally, the system configuration of the data management apparatus is similar to that of the first embodiment, and accordingly the description thereof is omitted.

Moving Image Data to be Subject of Processing

Figure 10:
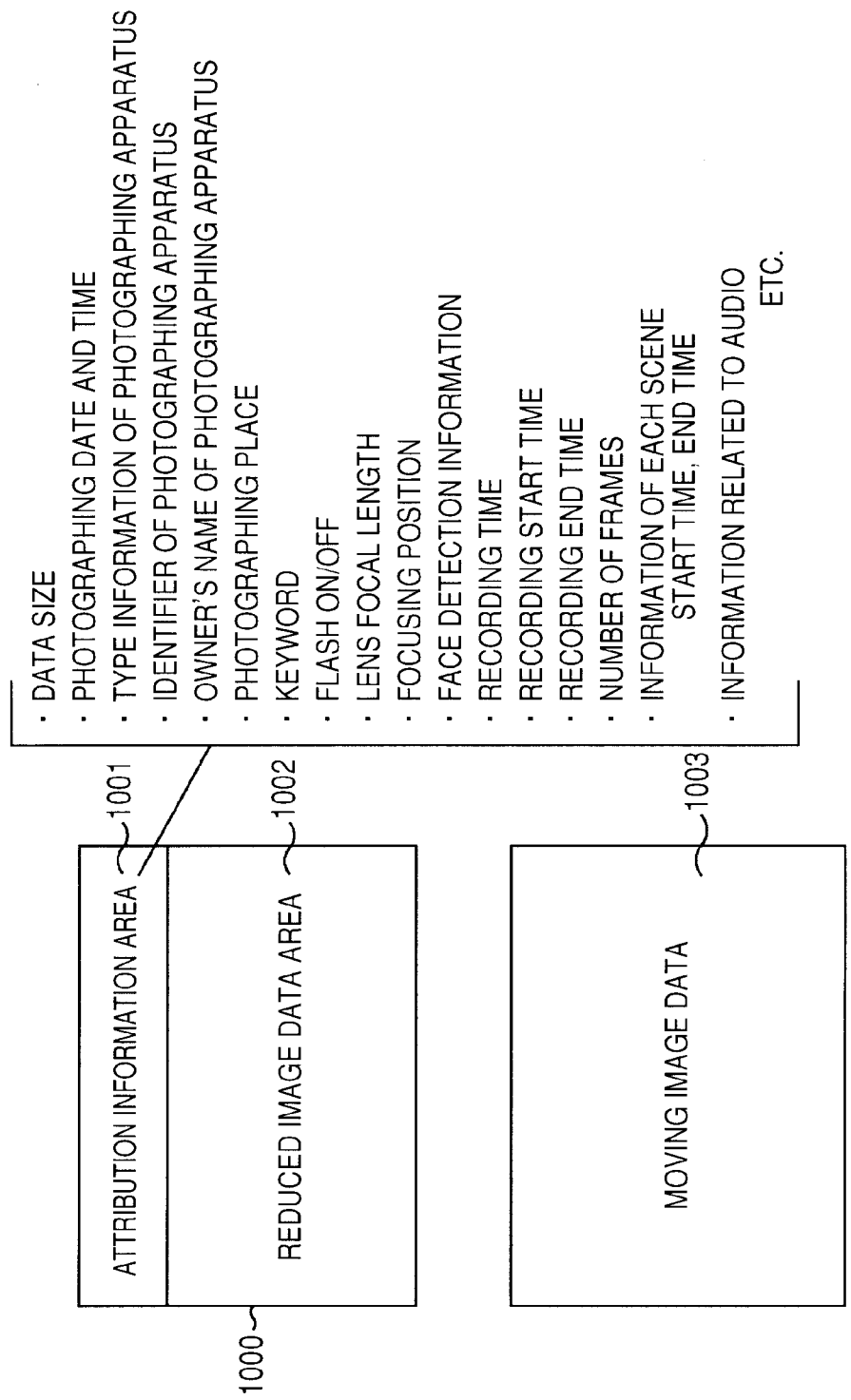
FIG. 10 is a schematic configuration diagram of a moving image data file including moving image data to be a subject of processing of a data management apparatus according to a second embodiment of the present invention.

FIG. 10 is a schematic configuration diagram of a moving image data file (hereinafter referred to be as moving image file) containing moving image data to be a subject of processing of the data management apparatus according to the present embodiment.

In FIG. 10, a moving image information file 1000 is composed of an attribution information area 1001 and a reduced image data area 1002 for a list display. The attributed information area 1001 for moving image data is the area for storing the information at the time of photographing, such as a photographing date and time, an identifier of a photographing apparatus, the type information of the photographing apparatus, the owner's name of the photographing apparatus, a photographing place, a keyword set by a photographer and the like. Moreover, the attribution information area 1001 stores the information peculiar to an moving image, which is necessary for reading, reproducing and selection thereof in addition to those pieces of information mentioned above. The information peculiar to the moving image is a recording time, a recording start time (date and time), a recording end time (date and time), the number of frames to be reproduced per second, the information of each scene, the information related to audio, and the like. Furthermore, a photographing-concentrating time period decision flag similar to that described with regard to the first embodiment is also stored in the attribution information area 1001.

The reduced image data area 1002 is an area in which reduced image data to be displayed at the time of a list display is stored. If moving image data is divided into a plurality of scenes in a photographing apparatus or the other moving image data editing apparatus, the reduced image data generated from the data of the starting frame of each scene is set to be held. If scene division is not performed, the reduced image data generated from the data of the starting frame of the moving image data is set to be held.

Incidentally, it is supposed that the recording method of information into the attribution information area 1001 and the reduced image data area 1002 is in conformity with the DCF standard in the present embodiment. The information to which the tag to be stored is previously determined by the DCF standard is stored in conformity with the DCF standard, and the information to which no suitable tags exist is stored by using the area of the makernote. In this case, the photographing-concentrating time period decision flag used in the processing of extracting the data of photographing-concentrating time period is set to be stored in makernote individually every scene in the form of four bits. When the photographing apparatus generates a moving image file, the four bits to be used for the photographing-concentrating time period decision flag is set to be "0000." Otherwise, the data of the photographing-concentrating time period decision flag is set not to be written.

A moving image data file 1003 is a file for recording all image data to be stored in the moving image file therein. The moving image data file 1003 is related to the moving image information file 1000, and the information of the moving image information file 1000 is used when the moving image data in the moving image data file 1003 is reproduced.

Data Extraction Processing in Photographing-Concentrating Time Period

Next, the flow of the data extraction processing in a photographing-concentrating time period of the data management apparatus according to the present embodiment will be described. The flow of the data extraction processing according to the present embodiment is basically similar to that of the first embodiment, but is different from that of the first embodiment in the following points because moving image data is used as the subject of processing.

In the first place, the display method of reduced image data and the information to be held in the produced list at Step S500 are different from those of the first embodiment. In the second place, the classification method at Step S503 is different from that of the first embodiment. In the third place, the writing method of the photographing-concentrating time period decision flag at Step S507 is different from that of the first embodiment. In the fourth place, the display method of a photographing-concentrating time period mark at Step S510 is different from that of the first embodiment.

In the following, the different points at the four steps mentioned above will be described in detail with reference to FIG. 5. Moreover, the user interface described with reference to FIG. 3 and the like, which are similarly configured to those of the first embodiment, will be also quoted in description suitably.

Figure 13:
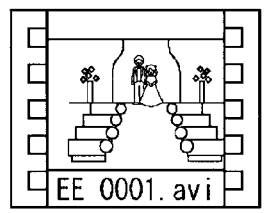
FIG. 13 shows an example of a display method of moving image data in the second embodiment of the present invention.
Figure 14:
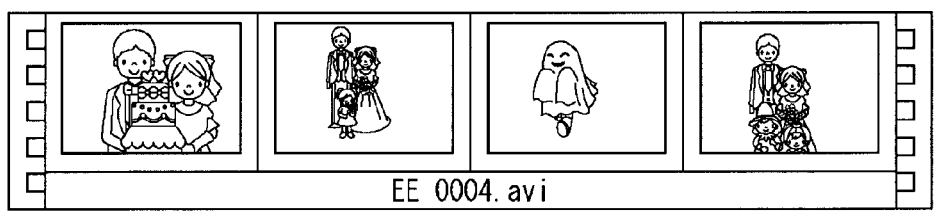
FIG. 14 shows an example of a display method of a plurality of scenes when moving image data is divided into the plurality of scenes in the second embodiment of the present invention.

First, the processing at Step S500 is described. At Step S500, the CPU 101 reads the image files in the folder designated by a user with the folder designation button 301 from the HDD 105, the FDD 106, or the media drive 108 into the RAM 103. Then, the CPU 101 displays the reduced image data of the reduced image data area 1002 of each image in the area 302 for image list display. An example of the display method of the reduced image data corresponding to the thumbnail frame 308 is illustrated in FIG. 13. Incidentally, if the moving image data is divided into a plurality of scenes, the plurality of pieces of reduced image data stored in the reduced image data area 1002 is displayed. An example of the display method of the plurality of scenes corresponding to the thumbnail frame 308 in this case is illustrated in FIG. 14.

Moreover, the list produced at Step S500 is the one in which the information peculiar to the moving image is added to the list described with reference to FIG. 8. An example of the list is illustrated in FIG. 11.

In FIG. 11, a folder name 1101 corresponds to the folder name 801 of FIG. 8; a file name 1102 corresponds to the file name 802 of FIG. 8; a photographing date and time 1103 corresponds to the photographing date and time 803 of FIG. 8; and an identifier 1104 of each photographing apparatus corresponds to the identifier 804 of FIG. 8. In addition, type information 1105 of photographing apparatus corresponds to the type information 805 of FIG. 8; an owner's name 1106 of photographing apparatus corresponds to the owner's name 806 of FIG. 8; and a keyword 1108 is the keywords that photographers arbitrarily set (input) and corresponds to the keyword 808 of FIG. 8. These pieces of information are similar to those described above.

Information 1111 is the information for distinguishing the kinds of data and is used for distinguishing still image data and moving image data in the present embodiment. In this example, the information 1111 is set to be I in the case of still image data and M in the case of moving image data.

Scene information 1112 stores scene numbers starting from 1 of the first scene in order in the case where a piece of moving image data includes a plurality of scenes. If a plurality of scenes exists, individual piece of information is held to each scene as shown in rows 1116, 1117, 1118 and 1119.

A photographing start time 1114 and a photographing end time 1115 are included. In the case of still image data, the photographing end time 1115 is "NULL."

A photographing place 1107 indicates a place at the time of starting to photograph an individual moving image or an individual scene constituting a moving image.

All pieces of information described above are obtained from the attribution information area 1001. In the case of failing the obtainment or in the case where no corresponding information exists, the state is indicated by "NULL."

Classification information (class) 1109 is the information for classifying the time periods in which the moving image data to be subjects of processing is severally photographed. The details of the class 1109 will be described later. Incidentally, the class 1109 concerning all moving image files is made to be −1 at the time point of Step S500. A row 1120 illustrates an example of the information in the case where the file of a subject of processing is an image file of a still image format. An item concerning the information peculiar to a moving image and having no information corresponding to the image file of a still image is indicated by null.

Returning to FIG. 5, the processing at Step S503 will be described next. At Step S503, the CPU 101 classifies the time periods in which the moving image data to be subjects of processing has been photographed. If the moving image data to a subject of processing extends over a plurality of unit times, a plurality of time periods corresponds to the moving image data. Then, the numbers X1, X2, . . . , Xn of time periods are recorded in the class 1109. Supposing that the respective time periods may be denoted by time period 0 to time period [sepNum−1], the calculation method of the first time period X1 including the moving image data of a subject of processing is expressed by the following formula 3, and the calculation method of the last time period Xn is expressed by the following formula 4. It is supposed that each variable holds the following values.

$$X1 = ((capTime\_st - startTime)/sepTime) \quad (3)$$

$$Xn = ((capTime\_en - startTime)/sepTime) \quad (4)$$

Here, Time denotes a unit time; startTime denotes a start date and time of a predetermined time period; capTime_st denotes a photographing start time of the moving image data of a subject of processing; and capTime_en denotes a photographing end time of the moving image data of the subject of processing.

As an concrete example, the calculation methods of the time periods X1, Xn, . . . , Xn by the formulae 3 and 4 in the case of the following conditions are shown. Because the start time of the predetermined time period is the same date, the calculation concerning a day is omitted.

Conditions
Unit Time: 5 (minutes)
Start Date and Time of Predetermined Time Period: 9:00 on Apr. 20, 2008
End Date and Time of Predetermined Time Period: 9:59 on Apr. 20, 2008
Photographing Start Date and Time of Moving Image Data of Subject of Processing: 9:08:50 on Apr. 20, 2008
Photographing End Date and Time of Moving Image Data of Subject of Processing: 9:17:10 on Apr. 20, 2008
Calculation Method by Formula 3

1. Calculation of $capTime\_st - startTime$

[9:08:50] − [9:00:00] = 00:08:50

2. Calculation of $\frac{(capTime\_st - startTime)}{sepTime}$ $$X1 = [08:50/5:00]$$
$$= \left[\frac{(60 \times 8 + 50)}{(60 \times 5)}\right]$$
$$= 1$$

Calculation Method by Formula 4

1. Calculation of $capTime\_en - startTime$

[9:17:10] − [9:00:00] = 00:17:10

2. Calculation of $\frac{(capTime\_en - startTime)}{sepTime}$ $$Xn = [0:17:10 / 0:05:00]$$
$$= \left[\frac{(60 \times 17 + 10)}{(60 \times 5)}\right]$$
$$= 3$$

If the results of the calculations by the formulae 3 and 4 indicate that the values of X1 and Xn are the same values to each other, then the value of X1 is held in the class 1109. Moreover, if the values of X1 and Xn are different from each other and this difference is as the concrete examples mentioned above, also the numbers of the time periods in the middle are held in the class 1109 together with the values of X1 and Xn. That is, if the X1 is the time period 1 and the Xn is the time period 3, then 1, 2 and 3 are held in the class 1109. Moreover, if the moving image data of the subject of processing is subjected to scene division, an individual time period is calculated to each scene to be held in the class 1109.

Next, the processing at Step S507 will be described. At Step S507, the CPU 101 sets the time period N satisfying the predetermined conditions as a photographing-concentrating time period, and changes the four bits of the photographing-concentrating time period decision flags of all the image files photographed in the time period N in the attribution information area 1001 to "0001." In the case of moving image data, if the moving image data has been photographed in the photographing-concentrating time period (if there is a number agreeing with N in the class 1109), the CPU 101 changes the photographing-concentrating time period decision flag. However, if the moving image data of the subject of processing includes a plurality of scenes, the CPU 101 changes the photographing-concentrating time period decision flag of only the corresponding scene. If the attribution information area 1001 cannot be rewritten, then the CPU 101 holds the moving image data in the RAM 103 or the HDD 105, which is a storage medium, as attribution information, or as other data, and relates to the moving image data to the image file. Moreover, if moving image data overlaps with a photographing-concentrating period and the time of the photographing-concentrating period is remarkably short, the moving image data may be removed from the subjects of addition of the photographing-concentrating time period decision flags. For example, the moving image data the time of which is extremely short, the data in the row 1117 of FIG. 11 (the scene 2 of EE_004, the photograph starting of which is 9:39:11) in the case where the photographing-concentrating time period is 9:35:00 to 9:39:59, may be removed from the subjects of addition of the photographing-concentrating time period flag. If the time of the photographing-concentrating time period is shorter than an arbitrary time, for example, less than one minute, when moving image data is removed from the subjects of addition of the photographing-concentrating time period decision flag as described above, the moving image data is exempt.

Figure 15:
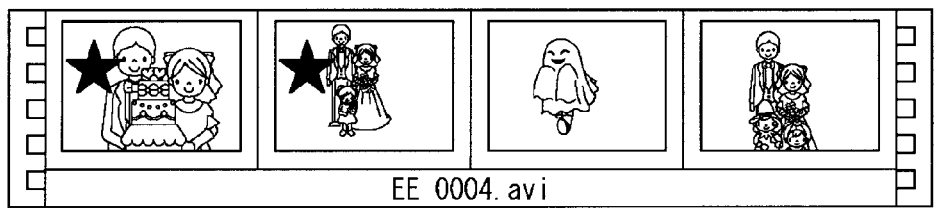
FIG. 15 shows a display example in the case where scenes 1 and 2 are photographed in a photographing-concentrating time period when moving image data includes a plurality of scenes in the second embodiment of the present invention.

Next, the processing at Step S510 will be described. At Step S510, the CPU 101 displays photographing-concentrating time period marks on the upper left sides of the thumbnail display areas 309 of moving image data also, if the four bits of the photographing-concentrating time period decision flags of the attribution information area 1001 are "0001," similarly to still image data. However, if the moving image data is divided into a plurality of scenes, the CPU 101 displays only the corresponding scenes with the photographing-concentrating time period marks attached. FIG. 15 shows a display example in the case where the scenes 1 and 2 of the case where there is a plurality of scenes illustrated in FIG. 14 are photographed in a photographing-concentrating time period.

Figure 12:
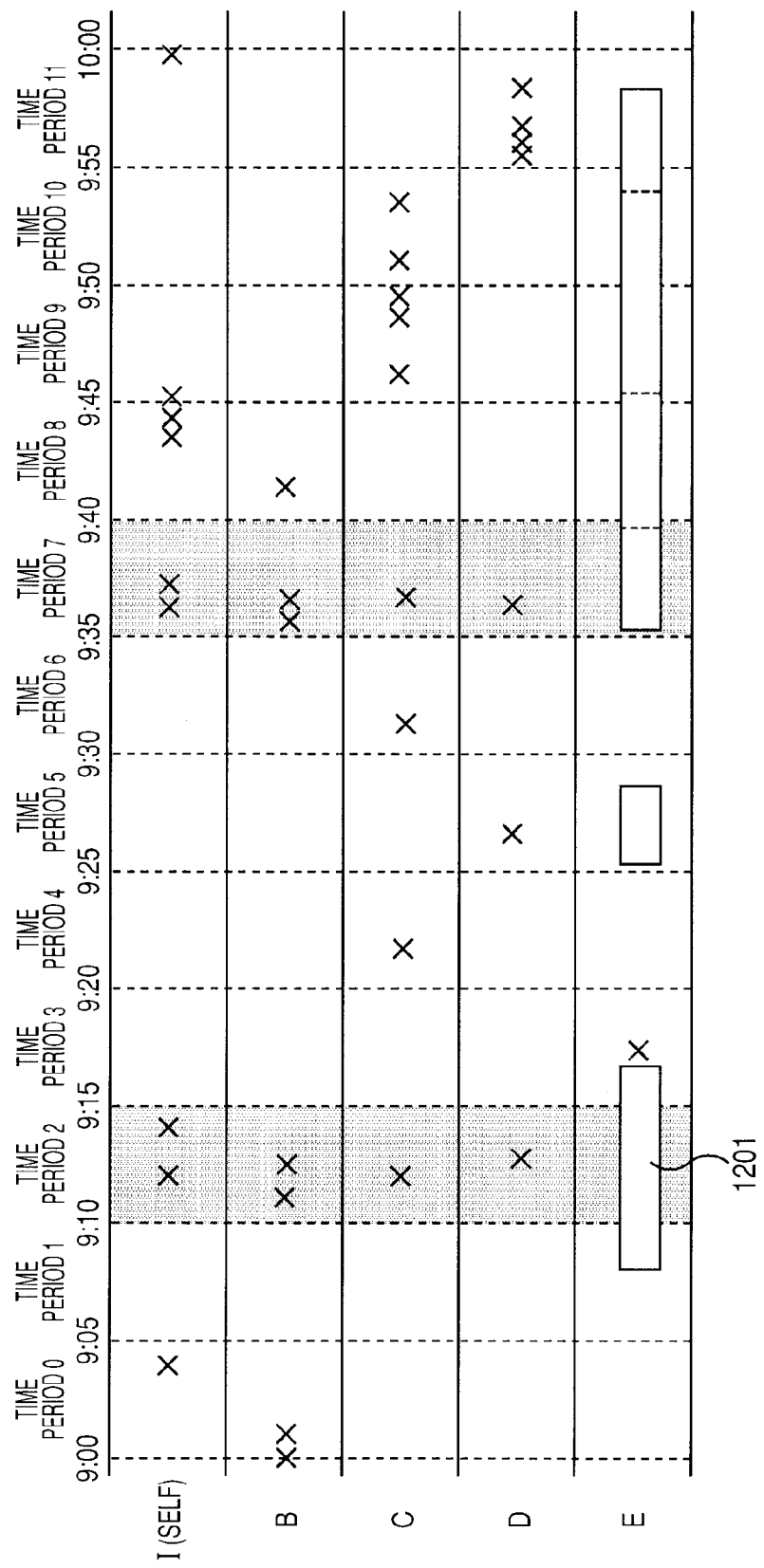
FIG. 12 is a conceptual diagram illustrating the relation between a distribution of the photographing times of images and photographing-concentrating time periods in the second embodiment of the present invention.

FIG. 12 is a conceptual diagram illustrating the relation between a distribution of the photographing dates and times of image data and photographing-concentrating time periods in the present embodiment. In FIG. 12, the abscissa axis indicates times, and x marks denote photographing dates and times when the image data is photographed similarly to FIG. 6. The characters in the ordinate axis are the names of the owners of photographing apparatus. The different point of FIG. 12 from FIG. 6 is a zonal mark 1201. The zonal mark 1201 indicates the photographing of a moving image. The zonal mark 1201 shows that E photographed moving image data from 9:08:50 to 9:17:10. Incidentally, in the example illustrated in FIG. 12, extracts all still image data and moving image data and the scenes of moving images photographed in the time periods 2 and 7 (hatched time periods in FIG. 12), at which photographing by five photographing apparatus concentrates, are extracted by the data extraction method described above.

Incidentally, in the case where the still image data and moving image data intermingle, is arranged not to perform only the processing peculiar to the moving image data described in the present embodiment. Consequently, it is needless to say that the extraction processing is possible also in the case of intermingling.

The second embodiment of the present invention has been described in the above. In the data management apparatus according to this embodiment, if there is a plurality of pieces of still image data and moving image data photographed at a specific time period and the plurality of pieces of still image data and moving image data is photographed by a plurality of photographing apparatus, then those pieces of image data are determined as significant data to be extracted. The candidate of significant image data for a group can be easily extracted by such a configuration even if a plurality of pieces of still image data and moving image data photographed by a plurality of photographing apparatus intermingles.

Moreover, the data management apparatus according to the present embodiment can extract the candidate of significant image data for a group even if a subject of processing is the moving image data which extends over a plurality of unit times. Moreover, even if moving image data has been subjected to scene division, the candidate of a scene significant for a group can be extracted from respective scenes.

Third Embodiment

Next, a third embodiment of the present invention will be described. In order to improve the accuracy of the extraction processing of a candidate of image data significant for a group participating in a common event, the method of selecting image data of a subject of processing and the method of changing the weighting at the time of counting the number of pieces of photographing apparatus discrimination information will be described with respect to a data management apparatus according to the present embodiment. The system configuration of the data management apparatus is similar to that of the first embodiment, and accordingly the description thereof is omitted.

Event Discrimination Processing

The event discrimination processing can improve the accuracy of the extraction processing of a candidate of significant image data for a group participating in a common event by selecting the image data of a subject of processing. The reason is that, if the image data of a person who is not participating in an event intermingles in the image data of a subject of processing, the photographing-concentrating time period cannot be discriminated with good accuracy, and that a photographing-concentrating time period mark is also attached to the image data that has no relation at all.

If a concrete example is given, it is supposed that it is desired to extract the image data of a scene of wedding cake cutting which all gusts simultaneously photographed from the image data of a group participating in the wedding ceremony of a person A. However, if the image data of a concert held in the same time period at another place intermingles, the images of the concert are also extracted, and there is the possibility of failing the extraction of the scene of the wedding cake cutting. Accordingly, the accuracy can be raised by performing the extraction processing after discriminating whether image data is that photographed by participating in the same event or not.

Figure 16:
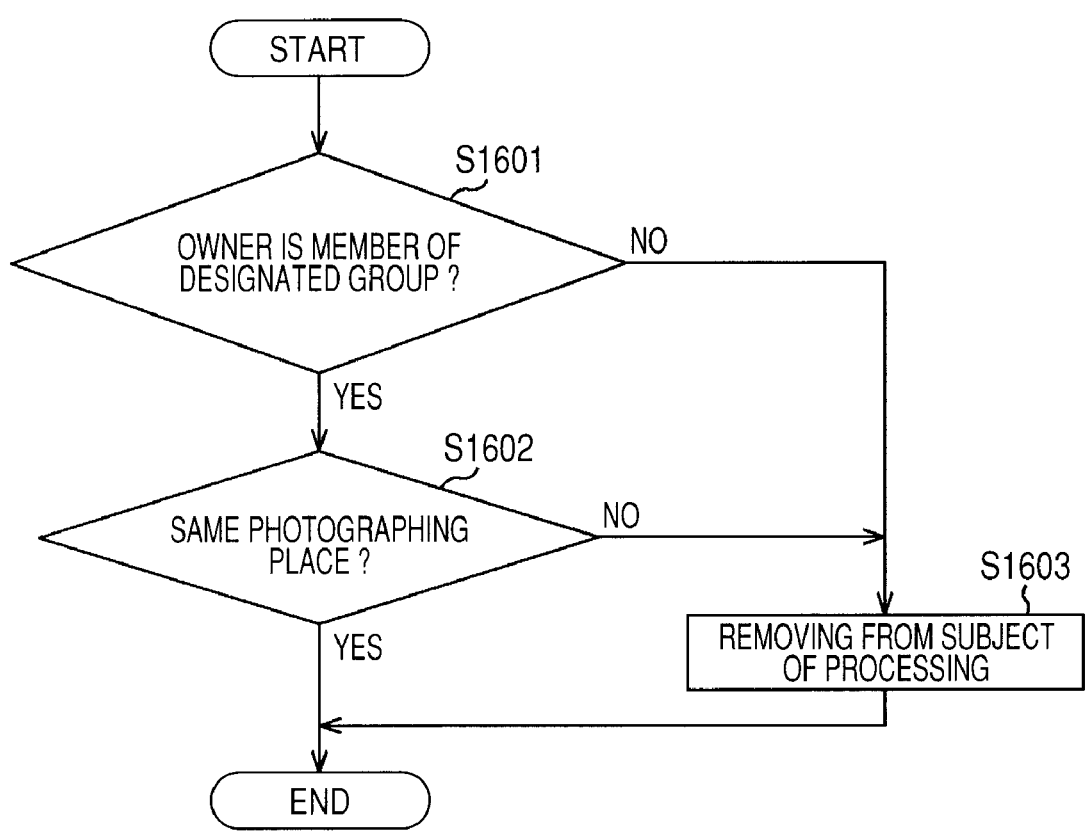
FIG. 16 is a flow chart illustrating the flow of event discrimination processing for discriminating whether pieces of data are those photographed in the same event or not in a data management apparatus according to a third embodiment of the present invention.

FIG. 16 shows a flow chart of event discrimination processing of discriminating whether image data is that photographed in the same event or not in a data management apparatus according to the present embodiment. This discrimination processing is made to be performed to individual piece of image data between the processing at Step S500 and the processing at Step S501. Moreover, this processing is executed by the execution of a control program stored in the RAM 103 by the CPU 101.

First, at Step S1601, the CPU 101 collates the information of the owner's name 806 or 1106 with the names of group members to discriminate whether they agree with each other or not. If they agree with each other, the processing advances to Step S1602. If they do not agree with each other, the processing advances to Step S1603. At Step S1603, the information of the owner's name 806 or 1106 is removed from the subject of processing at the processing subsequent to Step S501. Incidentally, all the names of group members are supposed to be input by a user.

The CPU 101 discriminates whether the information of the photographing places 807 or 1107 are the same or not at Step S1602. Whether the information is the same or not is discriminated on the basis of whether the distances from a reference place are within a predetermined range (for example, the radius range of 500 m) or not by means of the information of latitude and longitude of the photographing places 807 or 1107. If the CPU 101 discriminates that two photographing places 807 or 1107 are the same, the CPU 101 ends the processing (but the removal of the places 807 or 1107 from the subject of processing is not performed). On the other hand, if the CPU 101 discriminates that the places 807 or 1107 are not the same (the photographing was performed at places distant from each other by 500 m or longer), the CPU 101 advances the processing to Step S1603, and the CPU 101 removes the image data photographed at the photographing places 807 or 1107 from the subject of processing at the processing subsequent to Step S501.

Incidentally, although the names of the group members are supposed to be input by a user here, the names may be obtained and held from image data by the data management apparatus by selecting the photographed data. Although the discrimination has been performed as to whether pieces of image data have been photographed in the same event or not on the basis of the information of the owner's names and the photographing places, the discrimination may be performed on the basis of the keywords or face detection results.

Figure 17:
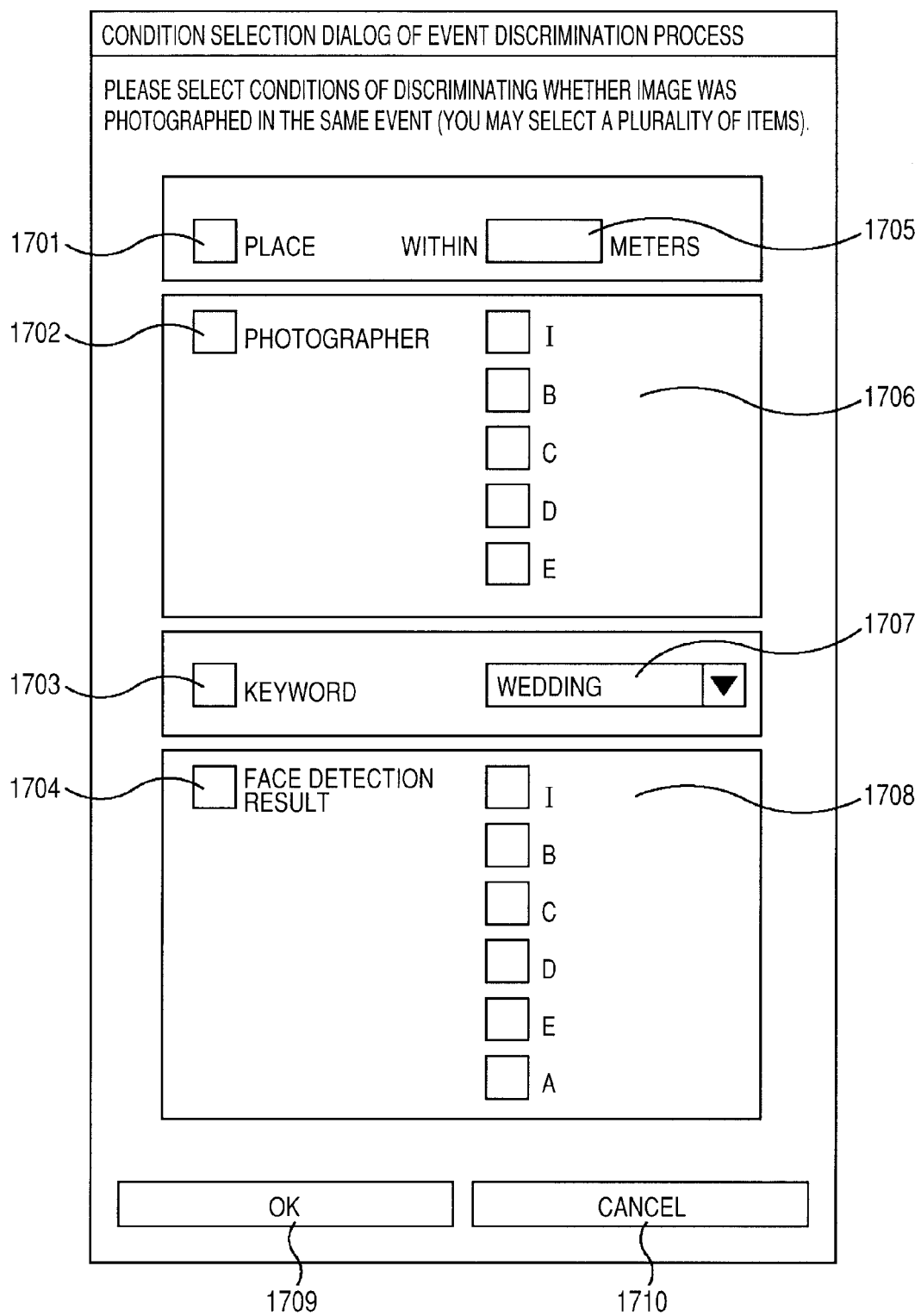
FIG. 17 shows an example of a user interface for enabling a user to designate desired conditions for deciding whether photographing has been performed in the same event or not in the data management apparatus according to the third embodiment of the present invention.

Moreover, the aforesaid event discrimination processing may be adapted to be able to designate the conditions to be used for the discrimination. FIG. 17 is a view illustrating an example of a user interface for a user to designate conditions.

In FIG. 17, a check box 1701 is for designating a photographing place, and a check box 1702 is for designating a photographer to allow a user to input a standard for determining whether photographing places are the same or not (the latitude and the longitude of a place to be the standard and a radius from the place). A check box 1703 is for designating a keyword, and a check box 1704 is for designating a face detection result. These check boxes are for selecting conditions. Although the check boxes are exemplified here, the other operation members may be used. If a plurality of conditions is not allowed to be selected, then an operation member such as a radio button may be used.

An edit box 1705 is for designating a scope of a place. If no values are input although the photographing place designation check box 1701 is in its on state, a warning is output to urge a user to perform an input.

A check box group 1706 is a group for designating photographers. The names of all photographers to be candidates are enumerated to be displayed by means of the information of the list produced at Step S500. Then, by the turning-on of the check boxes by a user, photographers are designated. If no photographers are designated and an OK button 1709 is depressed although the photographer designating check box 1702 is in its on state, a warning is output to urge a user to select the photographers.

A list box 1707 is for designating a keyword. The keywords to be candidates are enumerated to be displayed in the list box 1707 by means of the list produced at Step S500.

A check box group 1708 is for designating the persons detected by a face detection result. All the persons capable of being face-detected are enumerated to be displayed. If no persons are designated and the OK button 1709 is depressed although the face detection result designating check box 1704 is in its on state, a warning is output to urge a user to select the persons.

The OK button 1709 is for determining an input under the conditions set by means of the various check boxes mentioned above. A cancel button 1710 is for cancelling an input.

Incidentally, if no data of a subject of processing comes to exist by the aforesaid discrimination method, a warning of the unsuitableness of the information to be used for event discrimination is displayed to urge a user to perform the setting of the conditions again.

Weighting at Counting of Number of Photographing Apparatus

The method of changing (increasing or decreasing) the weighting at the time of counting the number of photographing apparatus, which method is described here, is to change the weight of individual count of the photographing apparatus at Step S506 mentioned above, and to change the accuracy of the extraction processing of image data significant for a group in accordance with the desire of a user. In the following, the weighting method will be described.

In the first place, the weights are changed according to the owners of photographing apparatus. For example, the weights of the counts of the user's own photographing apparatus are made to be heavier than those of the others. Thereby, the image data photographed by the members of a group with concentration can be extracted with the image data photographed by the user placed at the center. In this case, only the count of the user's own photographing apparatus is set to two or the like at Step S506.

Moreover, if a person who participates in the same event but is a stranger is an owner of a photographing apparatus, the count of the photographing apparatus may be made to be light, or no counts may be performed to the photographing apparatus. Consequently the scene photographed by the stranger with interest becomes hard to be extracted.

If a concrete example is given, a person I (name), who is a user of the data management apparatus of the present embodiment, is a friend of a person A during high school, and is a stranger for the kinsfolk of the person A. However, many pieces of image data of a person D, who is one of the kinsfolk of the person A, were obtained. Because the person D photographed only the kinsfolk of the person A, I has many pieces of data of no interest. In such a case, if the weight of the count of the photographing apparatus of the person D is made to be light or the photographing apparatus is not counted, then the image data photographed by the person D with interest becomes difficult to be extracted.

In the second place, the weights of the counts are made to be light according to the places where image data is photographed. Otherwise, no counts are performed. Consequently, the data of a scene at a far place becomes hard to be extracted. The weights of counts may also be changed in inverse proportion to the distances of places. In that case, the counts are led to be lighter as the places become farther.

In the third place, if a significant mark is previously set to image data, the weight of the count thereof is made to be heavier. Thereby, the image data photographed by the members of the group with concentration can be extracted around the image data having the set significant mark. Incidentally, the significant mark indicates the significance of image data, and the existence of the setting thereof is supposed to allow a photographer to arbitrarily input the significant mark to store the significant mark as attribution information or not to store it.

In the fourth place, if image data is moving image data of a long time, the weight of the count thereof is made to be light. Otherwise, no counting is performed. If a concrete example is given, all the events are sometimes continuously photographed in the form of moving image data. However, in order to discriminate a scene photographed by all with concentration, accurate extraction is not always performed in the case of counting the moving image of a long time equally to the other image data. Accordingly, the weight of the count may be changed to be in inverse proportion to the length of the photographing time of the moving image. In that case, the count becomes lighter as the moving image is photographed for a longer time.

The third embodiment of the present invention has been described in the above. In the data management apparatus according to this embodiment, if there is a plurality of pieces of image data including still image data and moving image data photographed at a specific time period and the plurality of pieces of image data is photographed by a plurality of photographing apparatus, those pieces of image data are determined as significant image data to be extracted. At this time, it is determined before performing determination according to a predetermined condition whether the image data to be a subject of determination is made to be a subject of determination or not. The extraction of a candidate of significant image data for a group from, for example, the image data photographed by the persons participating in the same event is enabled by such a configuration.

Moreover, the data management apparatus according to the present embodiment changes the weighting of the counts of photographing apparatus in the determination whether photographing has been performed by a plurality of photographing apparatus or not according to the predetermined condition (for example, the owners of the photographing apparatus). The accuracy of the extraction processing of a candidate of the significant image data for a group can be changed in accordance with a desire of a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

This application claims the benefit of Japanese Patent Application No. 2009-095310, filed on Apr. 9, 2009, which is hereby incorporated by reference herein in its entirety.

What is claimed is:

1. An image managing apparatus for managing a plurality of image files stored in relation to photographing time and identification information of photographing apparatus in a storage thereof, comprising:
   a processor; and
   a memory configured to store at least one program executable by the processor, at least one program comprising a program code that, when executed by the processor, implements:
   a classifying unit configured to classify the image files to predetermined time periods based on the photographing time;
   a count unit configured to count, for every predetermined time period, the number of the photographing apparatuses which generated the image files of the photographing times classified in each predetermined time period, based on the identification information of photographing apparatuses related to the image files;
   a selection unit configured to select at least one of the predetermined time periods in accordance with the counted number; and
   an extraction unit configured to extract the image file related to the photographing time belonging to the selected time period from among the plurality of image files stored in the storage.

2. The apparatus according to claim 1, further comprising:
   a display control unit configured to discriminate the extracted image file and a not-extracted image to display the discriminated images.

3. The apparatus according to claim 1, wherein
   the photographing time is based on a photographing start time and a photographing end time when the image file includes a moving image data.

4. The apparatus according to claim 1, wherein
   the image is stored in relation to attribution information including at least one piece of information of owner information of the photographing apparatus, photographing place information, keyword information and subject information, and
   the count unit does not count the number of the photographing apparatuses which generated the image file related to the attribution information which satisfies a predetermined condition.

5. The apparatus according to claim 1, wherein
   the count unit performs counting by weighting the number of the pieces of identification information of the photographing apparatus in accordance with at least one of owner information of the photographing apparatus, photographing place information, a recording time of a moving image.

6. The apparatus according to claim 1, further comprising:
   a change unit configured to change the length of the predetermined time period according to the number counted by the count unit.

7. The apparatus according to claim 1, wherein
   the selection unit selects the predetermined time period, to which the counted number greater than a predetermined value belongs.

8. The apparatus according to claim 1, further comprising:
a setting unit configured to set an identifier representing a degree of significance to the image file belonging to the predetermined time period.

9. The apparatus according to claim 1, further comprising:
a display unit configured to display the image representing the extracted image file, together with a predetermined mark added to the image.

10. An image managing method of managing a plurality of image files stored in relation to photographing time and identification information of photographing apparatus in a storage thereof, comprising the steps of:

causing a processor to execute a program code of at least one program code stored in a memory to implement:

a classifying unit configured to classify the image files to predetermined time periods based on the photographing time;

a count unit configured to count, for every predetermined time period, the number of the photographing apparatuses which generated the image files of the photographing times classified in each predetermined time period, based on the identification information of photographing apparatuses related to the image files;

a selection unit configured to select at least one of the predetermined time periods in accordance with the counted number; and an extraction unit configured to extract the image file related to the photographing time belonging to the selected time period from among the plurality of image files stored in the storage.

11. A non-transitory storage medium storing a program comprising program code for causing a computer to execute a method of managing a plurality of image files stored in relation to photographing time and identification information of photographing apparatus in a storage thereof, the method comprising the steps of:

classifying the image files to predetermined time periods based on the photographing time;

counting, for every predetermined time period, the number of the photographing apparatuses which generated the image file of the photographing time classified in each predetermined time period, based on the identification information of photographing apparatuses related to the image files;

selecting at least one of the predetermined time periods in accordance with the counted number; and extracting the image file related to the photographing time belonging to the selected time period from among the plurality of image files stored in the storage.

* * * * *